UNITED STATES PATENT OFFICE.

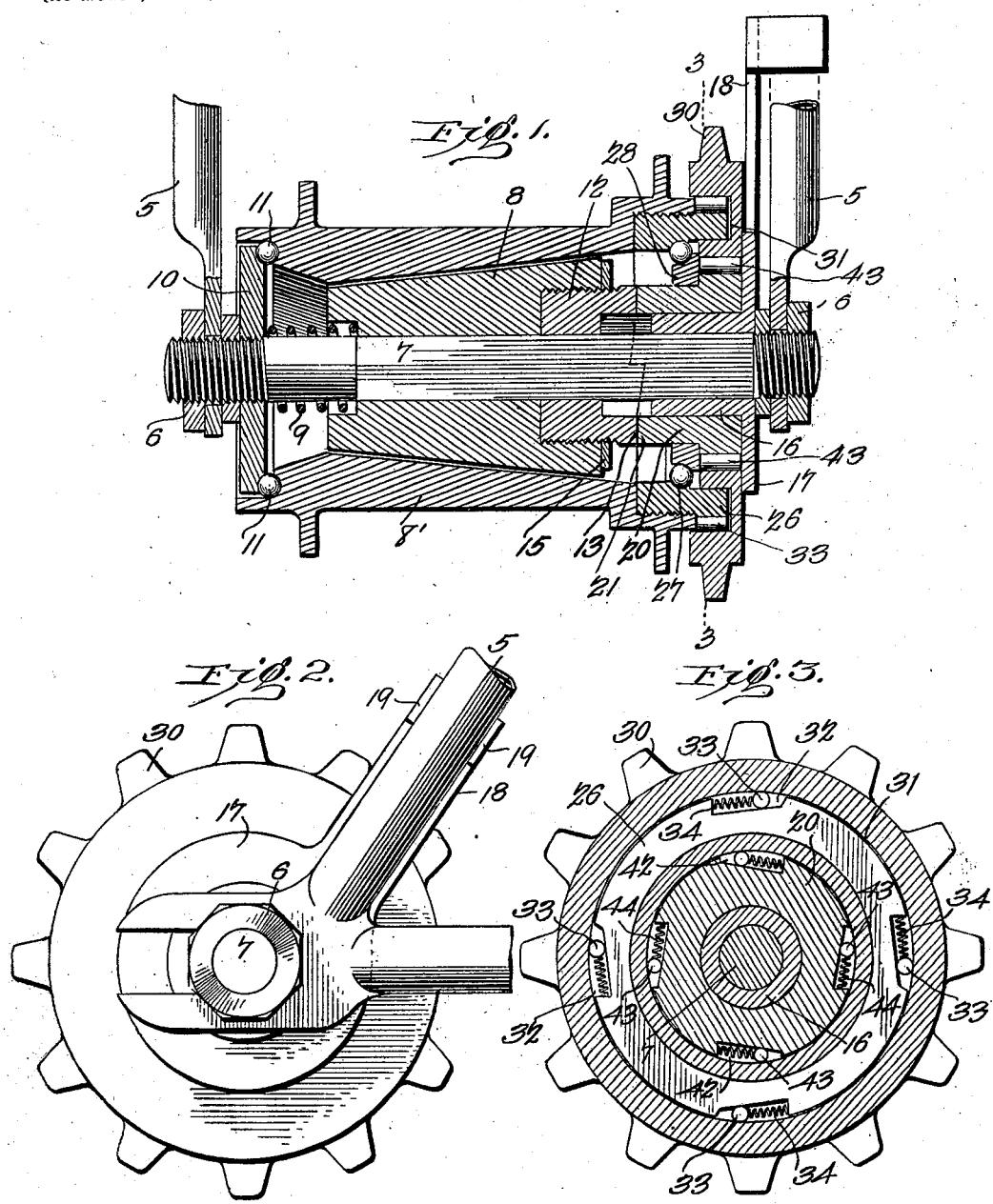

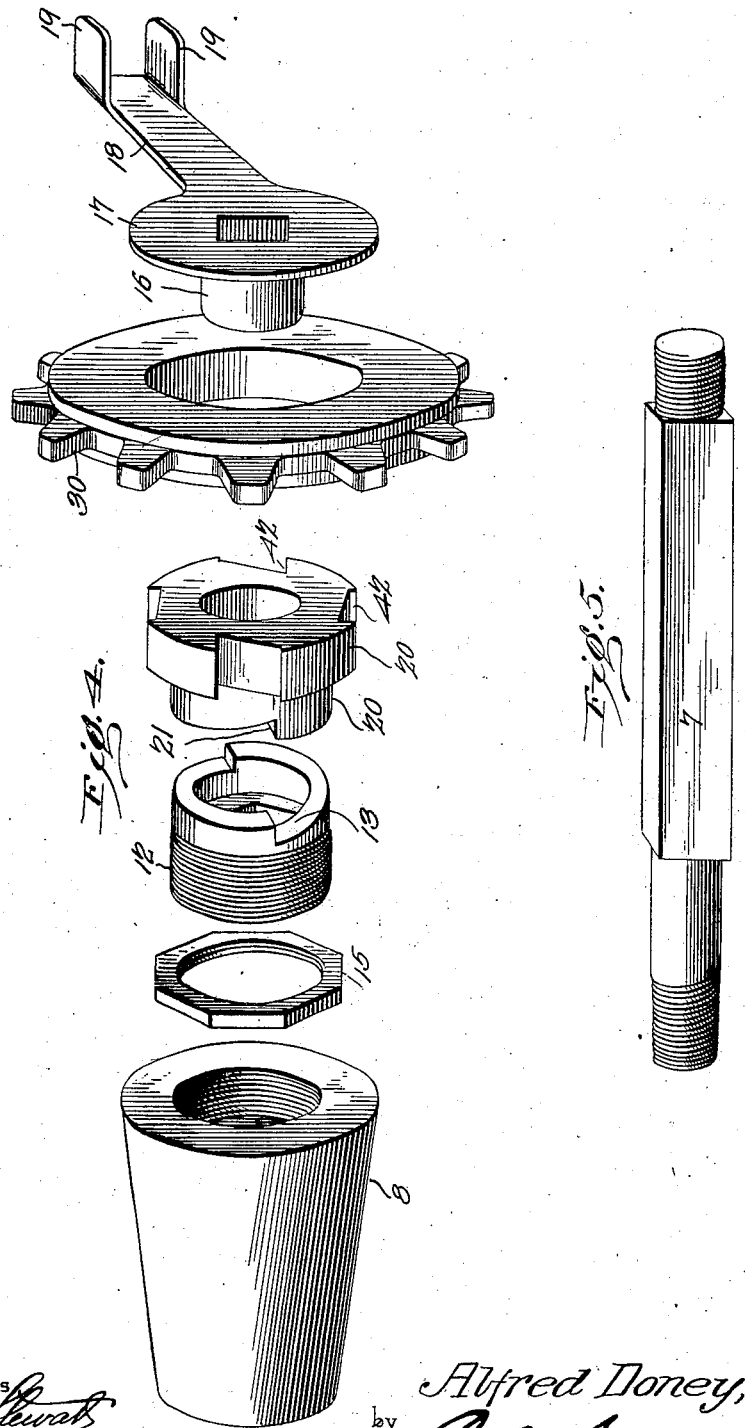

ALFRED DONEY, OF PEN ARGYL, PENNSYLVANIA, ASSIGNOR OF ONE-THIRD TO LEONIDAS W. MORSS, OF SCRANTON, PENNSYLVANIA.

BICYCLE-BRAKE.

SPECIFICATION forming part of Letters Patent No. 698,181, dated April 22, 1902.

Application filed November 4, 1901. Serial No. 81,136. (No model.)

*To all whom it may concern:*

Be it known that I, ALFRED DONEY, a citizen of the United States, residing at Pen Argyl, in the county of Northampton and State of Pennsylvania, have invented a new and useful Bicycle-Brake, of which the following is a specification.

My invention relates to certain improvements in bicycle-brakes of that class known as "back-pedaling" brakes, in which a movable conical braking-surface is moved into frictional contact with a similar surface in the interior of the rear-wheel hub.

The object of the invention is to provide a brake of simple and economical construction in which an extensive braking-surface is afforded and one which has comparatively few operating parts, which may be readily taken apart or assembled by an ordinary cyclist.

A further object is to provide for the taking up and adjustment of the friction contact-surfaces as they wear away.

With these and other objects in view the invention consists in the novel construction and combination of parts hereinafter described, illustrated in the accompanying drawings, and particularly pointed out in the appended claims.

In the drawings, Figure 1 is a longitudinal sectional elevation of the hub of the rear or driving wheel of a bicycle provided with a back-pedaling brake arranged and constructed in accordance with my invention. Fig. 2 is an end elevation of the same. Fig. 3 is a sectional elevation of a portion of the brake-operating mechanism on the line 3 3 of Fig. 1. Fig. 4 is a detail perspective view of a number of the more important elements of the brake detached. Fig. 5 is a perspective view of the axle of the rear driving-wheel.

Similar numerals of reference are employed to designate corresponding parts throughout the several figures of the drawings.

5 5 designate a portion of the rear forks of a bicycle-frame, to which is secured by suitable nuts 6 the threaded ends of the rear axle 7. This axle for the greater portion of its length is square or polygonal in cross-section and supports a conical friction-block 8, formed of fiber or some equivalent material and adapted for frictional braking-contact with the tapering inner surface of the rear-wheel hub 8', but normally held out of contact therewith by a coiled compression-spring 9, extending between the smaller end of the brake-block and a disk 10, secured to the threaded end of the shaft and provided on its periphery with a ball-race for the support of bearing-balls 11. The opposite portion of the ball-bearing is formed in the end of the hub 8', as illustrated in Fig. 1.

The larger end of the brake-block 8 is provided with a threaded orifice for the reception of a threaded collar 12, adapted to slide with the brake-block upon the shaft and provided at its outer end with a double cam-face 13. The collar 12 may be removed, together with the brake-block, from the squared portion of the shaft and adjusted to any desired position within said block in order to provide for the taking up of the wear of the friction-block, and a lock-nut 15 may be provided to lock the parts in any adjusted position, although this is not necessary when the parts have been adjusted and are to be immediately replaced, as both are provided with openings corresponding to the contour of the shaft 7 and are incapable of independent rotative movement when in position on said shaft.

In order to firmly lock the shaft against rotation, I employ a collar 16, having a circular peripheral portion and provided with a squared orifice for the reception of the shaft. At the outer end of the collar is an annular flange 17, from which extends an arm 18, having locking-ears 19, arranged at its outer end and adapted to engage the opposite sides of one of the forks of the rear frame. On the peripheral portion of the collar 16 is mounted a revoluble collar 20, having at its inner end two cam-faces 21, adapted for operative contact with the mating cam-faces 13 on the collar 12, and when the collar 20 is revolved in a direction opposite to the normal direction of travel of the rear-wheel hub these cam-faces will operate to move the brake-block 8 in the direction of the spring 9, the periphery of the block being brought into frictional contact with the inner surface of the hub and exerting a braking effect thereon.

In that end of the rear-wheel hub opposite the bearing-disk 10 is screwed or otherwise secured a ring 26, in which is formed a ball-race for the support of bearing-balls 27, the opposite half of the race being formed on a ring or collar 28, secured to or formed integral with the collar 20.

On the periphery of the ring 26 is mounted the rear sprocket-wheel 30, which may be connected by the usual link belt to the driving-sprocket on the crank-shaft of the machine. This sprocket-wheel is also supported on the periphery of the collar 20, the inner face of the sprocket being provided with an annular groove 31 for the reception of the ring 26, as shown more clearly in Figs. 1 and 3.

In the periphery of the ring 26 are formed a series of openings or notches 32, the inner walls of which are inclined, and in said openings are placed friction-rollers 33, which are normally held in position in the narrowest portions of the openings by springs 34, forming a ratchet-clutch, which is in operation during the forward movement of the bicycle, as indicated by the arrow in Fig. 3, the clutch serving to couple the sprocket-wheel to the rear-wheel hub and to rotate the latter for traveling the bicycle.

In the periphery of the collar 20 are formed openings or notches 42, having inner inclined walls, and in said openings are rollers 43, normally held in clutching position by springs 44. During the forward travel of the bicycle the clutching mechanism between the collar 20 and the inner surface of the sprocket-wheel is inoperative.

When the rider stops pedaling, the chain and sprocket-wheel will stop, but the hub will continue to rotate freely, permitting the rider to coast. When it is desired to apply the brake, the pedals are turned slightly in a reverse direction, causing the immediate engagement of the clutching mechanism between the sprocket-wheel and the collar 20. This movement causes the cams 21 and 13 to coact, producing a longitudinal movement of the brake-block in the direction of the spring 9 and bringing the periphery of the block into contact with the inner surface of the hub. The friction exerted is at all times absolutely under the control of the rider and may be applied very gradually, if desired, in order to slowly stop the machine.

It will be noted that when the brake-block is in contact with the friction-surface of the hub the smaller end of the block will extend a short distance beyond the hub-surface, the wear of the parts being such that the block can always be adjusted to a new position without coming in contact with any ridges or rings formed on either surface. This construction is illustrated in Fig. 1, the brake-block being shown in inoperative position, with its smaller end directly in alinement with the smallest diameter of the hub friction-surface. It is apparent that the slightest endwise movement of the brake-block under the influence of the cams will cause the smaller end of the block to travel beyond the smallest diameter of the hub, so that those surfaces of the block and hub which are in frictional contact during the braking operation will not be subjected to any uneven wear, such as might tend to cause the formation of ribs or ridges and prevent proper action of the brake when it becomes necessary to adjust the brake-block to take up for wear.

Although the structure as herein illustrated and described presents the preferred form of the device, it is obvious that many changes in the form, proportions, size, and minor details of construction may be made within the scope of the claims without departing from the spirit or sacrificing any of the advantages of my invention.

Having thus described my invention, what I claim is—

1. The combination in a back-pedaling brake, of a rear-wheel hub having an internal braking-surface, a fixed polygonal shaft, a non-rotatable brake-block mounted on said shaft, means for adjusting said brake-block longitudinally of the shaft, a cam-faced collar for moving said brake-block into operative position, a sprocket-wheel, and two concentrically-disposed clutching devices arranged in the same vertical plane, said clutches being interposed respectively between the cam-faced collar and the sprocket-wheel and between the rear-wheel hub and the sprocket-wheel, and adapted for operation in opposite direction.

2. The combination in a back-pedaling brake, of the hub having an inner braking-surface, a polygonal shaft rigidly secured to the frame of the machine, a non-rotatable brake-block mounted for longitudinal movement thereon, a collar adjustably secured in one end of the block and having an end cam, a second cam-faced collar adapted to coact therewith and having a clutch-face, a clutch-ring arranged concentrically with said second collar and carried by the hub, and a sprocket-wheel adapted to be engaged by one of said clutch-faces when traveling in a forward direction, and by the other of said clutch-faces when traveling in a reverse direction, said clutch-faces and the sprocket-wheel teeth being arranged in the same vertical plane, substantially as specified.

3. The combination in a back-pedaling brake, of a rear-wheel hub having an abruptly-terminating internal friction-surface, a longitudinally-movable brake-block adapted to engage said friction-surface, the smaller end of said brake-block being extended slightly beyond the smaller end of the hub friction-surface when the friction-surfaces of the brake-block and hub are in contact, thereby to avoid uneven wear, a rigid shaft carrying said brake-block, and means for effecting a longitudinal movement of said brake-block, substantially as specified.

4. The combination in a back-pedaling brake, of the rear-wheel hub having an inner braking-surface, a polygonal shaft, a collar having a circular periphery and provided with a central opening conforming to the shaft, an arm secured to or forming part of the collar and adapted to be secured to a fixed portion of the frame of the machine, a brake-block mounted on the shaft and longitudinally movable thereon, a cam-faced collar adjustably secured to said brake-block, a second cam-faced collar revoluble on the shaft-locking collar and provided with a peripheral clutch-face, a ring secured to or formed integral with the hub and also having a peripheral clutch-face, and a sprocket-wheel having an annular groove in its inner face for the reception of said ring, said sprocket-wheel being adapted to engage with either of said clutch-faces, substantially as specified.

5. The combination in a back-pedaling brake, of the hub having an inner braking-surface, a shaft, a non-rotatable brake-block longitudinally movable thereon, a shaft-locking collar having an outer flange, an arm secured to the collar and engaging a fixed portion of the frame of the machine, a cam-faced collar mounted on said locking-collar and provided with a peripheral clutch-face, a ring carried by the hub and also having a peripheral clutch-face, a sprocket-wheel having an annular groove for the reception of said ring and confined in position by the flange of the locking-collar, said sprocket-wheel being adapted to engage with one of such clutch-faces when traveling in a forward direction, and with the opposite clutch-face when traveling in reverse direction, substantially as specified.

6. The combination in a back-pedaling brake, of a shaft of square or polygonal form in cross-section, a disk secured to said shaft and having a peripheral ball-race, a hub also having a ball-race, bearing-balls for the support of the hub, the inner face of said hub being provided with a braking-surface, a brake-block longitudinally movable on the shaft, a compression-spring normally holding said brake-block in inoperative position, a cam-faced collar adjustably secured in the larger end of the brake-block, a shaft-locking collar having a circular periphery and provided with an enlarged annular end flange, an arm projecting laterally from the flange and having ears for securing the same to a fixed portion of the bicycle-frame, a cam-faced collar mounted on the shaft-locking collar and adapted to coact with the cam-collar of the brake-block, there being on the periphery of said second cam-faced collar, a clutching-face, a bearing-ring secured to or formed integral with the hub, a ball-bearing disposed between said ring and the second cam-faced collar, the peripheral surface of said ring being provided with a clutching-face, and a sprocket-wheel having in its inner face an annular groove for the reception of said ring, and confined in position by the enlarged annular flange of the shaft-locking collar, substantially as specified.

In testimony that I claim the foregoing as my own I have hereto affixed my signature in the presence of two witnesses.

ALFRED DONEY.

Witnesses:
W. R. GRUBB,
JOHN W. JONES.